F22-02 SR
7/7/87 OR F 000,304

United States Statutory Invention Registration [19]

[11] Reg. Number: H304
[43] Published: Jul. 7, 1987

Vorrier et al.

[54] PRINTING INK FOR USE ON FLEXIBLE FILMS

[75] Inventors: Robert J. Vorrier, Palos Hills; Vitas Niaura, Western Springs, both of Ill.

[73] Assignee: Viskase Corporation, Chicago, Ill.

[21] Appl. No.: 701,233

[22] Filed: Feb. 13, 1985

Related U.S. Application Data

[63] Continuation-in-part of Ser. No. 428,995, Sep. 30, 1982.

[51] Int. Cl.[4] ..... C08F 2/50; C08F 26/00
[52] U.S. Cl. ..... 522/92; 522/97; 525/920; 526/301
[58] Field of Search ..... 204/159.19; 525/920

[56] References Cited

U.S. PATENT DOCUMENTS

| | | | |
|---|---|---|---|
| 3,316,189 | 4/1967 | Adams | 260/13 |
| 3,700,643 | 10/1972 | Smith | 204/159.14 |
| 3,709,866 | 1/1973 | Waller | 204/159.23 |
| 3,931,676 | 1/1976 | O'Sullivan | 204/159.23 |
| 4,025,477 | 5/1977 | Borden | 260/23 EP |
| 4,108,840 | 8/1978 | Friedlander | 522/90 |
| 4,165,265 | 8/1979 | Nakabayashi | 204/159.14 |
| 4,174,307 | 11/1979 | Rowe | 204/159.19 |
| 4,183,796 | 1/1980 | Ansel | 204/159.23 |
| 4,239,866 | 12/1980 | Reitel | 204/159.14 |
| 4,287,039 | 9/1981 | Buethe | 204/159.19 |

*Primary Examiner*—John F. Terapane
*Assistant Examiner*—Susan Wolffe
*Attorney, Agent, or Firm*—John C. LeFever

[57] ABSTRACT

A low viscosity printing ink composition, based on acrylic terminated urethanes, is made which has a rapid curing rate and forms a cured impression that has a good adherence and flexibility. The ink can be used on flexible films, such as sausage casings, without cracking or bleeding.

46 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRINTING INK FOR USE ON FLEXIBLE FILMS

RELATED APPLICATIONS

This application is a continuation-in-part of copending U.S. patent application Ser. No. 428,995, filed Sept. 30, 1982.

FIELD OF THE INVENTION

The present invention relates to a printing ink composition suitable for printing on flexible polymeric films. More particularly, the present invention is directed to a printing ink composition for printing upon regenerated cellulosic films such as those used for sausage casings. The inks of the invention can be rapidly cured to a tack-free state by exposure to ultraviolet light.

BACKGROUND OF THE INVENTION

A satisfactory ink for printing upon polymeric films, such as regenerated cellulose films used in sausage casings, should cure to form a tack-free printed impression with good adhesion and abrasion resistance, and, yet, the cured impression should be flexible such that it will not crack upon flexing, wrinkling or stretching of the film. A satisfactory ink should also have a rapid curing rate, since methods of processing and handling sausage casings are quite rapid. Therefore, a rapid curing rate of the ink is desirable to be compatible with these high-speed handling and processing methods.

An example of such an ink for use upon such polymeric films is that disclosed in U.S. Pat. No. 3,316,189 to G. M. Adams. Disclosed is an ink composition, curable by the application of heat, that comprises a polyol prepolymer, such as polyester, polyether or castor polyols, an isocyanate prepolymer prepared from a polyisocyanate, a polymeric resin hardener, a pigment, and a volatile organic solvent.

With this ink, as with a number of other heat curable inks, the presence of the volatile organic solvent is undesirable, because, upon curing of the ink, this solvent volatilizes into the atmosphere creating possible health and safety problems. Efforts have been made to solve this problem by reducing or even eliminating the volatile solvents. A problem associated with this approach, however, is an increase in viscosity of the composition causing difficulties in handling and application. It is, therefore, desirable to produce a composition of proper viscosity that is free of volatile solvents. It is also desirable that the composition be curable using a minimal amount of energy.

Ink compositions have been developed that are free of volatile solvents, are curable with a low amount of energy by ultraviolet light, and have a low viscosity. However these compositions, being directed mainly to printing on paper or metal substrates have generally not been entirely suitable for use with flexible polymeric films such as those used for sausage casings. Although many of these compositions cure rapidly and are suitable for high-speed processing requirements, the printed impression formed by the cured ink is often brittle and is subject to cracking when the casing is folded or stretched. Other ultraviolet light curable ink compositions show greater flexibility and will cure to form impressions that will not crack. However these compositions generally have unsuitably slow curing rates and/or form tacky impressions with poor adhesion to the polymeric film substrate. Polymeric films, such as the cellulosic type used in food packaging require that the impression be flexible, and have good adhesion. The impression must be fully cured and not be tacky or rub off. It is generally the case that an ink composition that cures more rapidly and forms nontacky impressions of greater adherence is often more brittle and less flexible.

Thus, an ink composition having the conflicting and often exclusive properties of rapid cure under ultraviolet light and formation of an impression having physical properties suitable for use with flexible films, such as sausage casings, would be highly desirable. To form such an ink is very difficult, because of the many unpredictable factors associated with ink manufacture. The components of the ink will often interact in an unpredictable manner to adversely affect the properties of the ink such as, for example, the cure rate, and/or the physical properties relating to handling of the ink, such as viscosity and shelf life.

It is, therefore, an object of the invention to provide an ultraviolet curable ink composition that possesses the combination of properties to make it suitable for use for printing on flexible films.

SUMMARY OF THE INVENTION

It has now been found that an ink composition can be made that is free of volatile solvents, is rapidly curable with ultraviolet light, and forms an impression of suitable physical properties for use on flexible polymeric films such as sausage casings.

The invention in one aspect is an ultraviolet light curable ink composition which comprises (i) a first urethane comprising a polyol urethane which is the reaction product of about one equivalent of an isocyanate containing intermediate, the isocyanate intermediate being the reaction product of about one equivalent of a monomeric polyol and about two equivalents of an organic polyisocyanate, and one about equivalent of a monomeric olefinically unsaturated compound containing exactly one active hydrogen, and (ii) a second urethane comprising an acrylate-capped polycaprolactone defined by the formula;

$$(CH_2{=}\underset{\underset{Z}{|}}{C}COOROOCNH{-}G{-}NHCOO)_x{-}Q$$

where Z is hydrogen or methyl; Q is the residue remaining after reaction of the caprolactone polyol with the isocyanato and acrylyl compound, hereinafter more fully described; R is a linear or branched divalent alkylene having from about 2 to about 5 carbon atoms; G is the polyvalent residue remaining after reaction of a substituted or unsubstituted polyisocyanate with the caprolactone polyol and acrylyl compound and can be a linear or branched alkylene having from 1 to about 10 carbon atoms, or arylene, alkarylene and aralkylene having from about 6 to about 12 carbon atoms, cycoalkylene having from about 5 to about 10 carbon atoms, or bicycloalkylene having from about 7 to about 15 carbon atoms; and x is an integer having a value from 1 to 4;

(iii) an ultraviolet photoinitiator in an amount sufficient to cure the ink composition when exposed to ultraviolet light, and (iv) a pigment; with the proviso that the first urethane and the second urethane are present in an amount such that the weight ratio of the first urethane to the second urethane is from about 2:5 to about 3:2, preferably about 3:5 to about 5:5.

Another aspect of the invention is an ultraviolet curable ink comprising a first urethane which comprises the reaction product of an acrylated epoxidized drying oil and an organic isocyanate; a second urethane as defined above, an ultraviolet photo-initiator, and a pigment such that the first urethane and the second urethane are present in the weight ratios described above.

It is preferable to add a reactive diluent monomer, more fully described below, to provide a suitable viscosity for use as an ink.

The combined amounts of the first urethane and the second urethane should preferably be about from about 20 weight percent to about 80 weight percent, most preferably about 50 weight percent to about 70 weight percent. The reactive diluent monomer, if used, should be present in an amount from about 2 weight percent to about 30 weight percent, preferably about 5 to about 20 weight percent. The ultraviolet photoinitiator should be present in an amount from about 1 weight percent to about 10 weight percent, preferably about 3 weight percent to about 7 weight percent. The pigment should be present in an amount greater than 0 weight percent up to about 70 weight percent, preferably about 10 weight percent to about 50 weight percent. The above weight percentages are based upon the total weight of the ink composition.

The active hydrogen atoms referred to herein are those which display activity according to the Zerewitinoff test as described by Kohler, J. Am. Chem. Soc. 49, 3181 (1927).

DESCRIPTION OF THE INVENTION

POLYOL URETHANE

The polyol urethanes used in the invention are made by reacting about one equivalent of a monomeric polyol and an equivalent of an organic polyisocyanate, preferably a diisocyanate, to form an intermediate compound with terminal isocyanate groups. The intermediate compound is then reacted with an equivalent of an olefinic unsaturated compound having at least one active hydrogen. These compounds and a process for making the same are disclosed in U.S. Pat. No. 4,174,307, issued Nov. 13, 1979 to W. Rowe.

The monomeric polyols useful for making the polyol urethane for use in the invention are monomeric diols. triols, tetraols, and the like. Illustrative of the monomeric diols are ethylene glycol, propylene glycol, 1,3-butylene glycol, 1,4-butane diol, 1,5-pentanediol, hexamethylene glycol, etc., mono fatty acid esters of trimethylolethane, trimethylolpropane, and the like. Illustrative of the monomeric triols are trimethylolpropane, glycerol, castor oil, fatty acid monoglycerides such as ricinoleic monoglyceride, ricinoleic monoglycolate, monofatty acid esters of pentaerythritol, etc. Illustrative of the tetraols is pentaerythritol. Preferably, the polyols have a molecular weight of up to about 1,000 or higher. More preferably. they have a molecular weight of up to about 950, and most preferably, up to about 500.

Illustrative of the organic diisocyanates for use in making the polyol urethane useful in the invention are, for example, the aromatic, aliphatic, and cycloaliphatic diisocyanates, and combinations thereof. These include 2,4-tolulene diisocyanate, m-phenylene diisocyanate, xylylene diisocyanate, 4-chloro-1,3-phenylene diisocyanate, 4,4'-biphenylene diisocyanate, 1,4-cyclohexylene diisocyanate, 1,5-tetrahydronaphthalene diisocyanate, methylene dicyclohexylene diisocyanate and the like. Diisocyanates in which each of the two isocyanate groups is directly attached to a ring are preferred, since, generally, they react more rapidly with polyols. Especially preferred types are

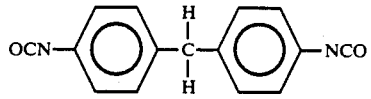

and

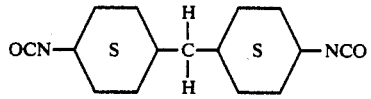

The diisocyanates can contain other substitutents, although those which are free from reactive groups, other than the two isocyanate groups, are preferred.

The above described polyols and organic diisocyanates are reacted to form an intermediate which is then reacted with an olefinically unsaturated compound to form the polyol urethane useful in the invention. Illustrative of these olefinically unsaturated compounds are those which contain at least one active hydrogen atom and at least one addition polymerizable olefinically unsaturated grouping, such as C=C . Those compounds containing one of each of these groups is preferred. Specifically illustrative of such monomeric unsaturated compounds are those containing active hydrogen atoms in a group such as aliphatic hydroxyl, phenolic hydroxyl, thiol, carboxyl, amine or amide and an unsaturated grouping, preferably present as terminal unsaturation such as, for example the vinyl and acrylic compounds. Preferably, olefinically unsaturated compounds contain from about 3 to about 12 carbon atoms. Examples thereof are acrylic acid, cinnamic acid, methacrylic acid, hydroxyalkyl acrylates and methacrylates such as hydroxyethyl acrylate and methacrylate, cinnamyl alcohol, allyl alcohol, diacetone acrylamide, unsaturated compounds containing secondary amino or amido groups, and the like.

A procedure that may be used to make the polyol urethane useful in the invention comprises placing about 2 equivalents of the organic polyisocyanate in a reaction vessel for each equivalent of active hydrogen atoms in the monomeric polyol. Preferably, the polyisocyanate is a diisocyanate. The polyol and the polyisocyanate should be water-free. The polyisocyanate may be reacted under an inert gas atmosphere such as, for example, nitrogen, with the polyol at temperatures of from about room temperature to about 70° C. Elevated temperatures are preferred. The polyol must be added slowly, e.g., incrementally, with stirring or agitation to the diisocyanate which is maintained at the reaction temperature, typically about 65°±5° C., by the rate of addition of the polyol and/or by heating and/or cooling, depending on the exotherm developed. The reaction temperature is held until the theoretical free remaining isocyanate weight percent is obtained as determined by titration of an aliquot from the reaction vessel with dibutylamine.

When the reaction is theoretically complete, the temperature is maintained and there is added with agitation one equivalent of the monomeric olefinically unsaturated compound and an effective amount of a vinyl polymerization inhibitor, such as hydroquinone. An effective amount of a catalyst is added to increase the speed of the reaction. Illustrative of the catalysts that may be used are metallic catalysts such as the organo metallics. These include the organotin compounds, such as stannous octoate, dibutyl tin dilaurate, etc.; organocobalt compounds such as cobalt naphthenate; lead compounds such as lead octoate; and zinc compounds such as zinc octoate. Other known catalysts such as mineral acids, such as hydrochloric acid, nitric acid or the like, or phosphines can be used. The reaction is continued for a period of time to assure complete reaction, which is when there are essentially no remaining isocyanate groups. The reaction mixture is cooled and yields the polyol urethane useful in the invention.

ACRYLATED EPOXIDIZED DRYING-OIL URETHANE

The acrylated epoxidized drying-oil urethane derivatives useful in the invention are produced by the reaction of an organic mono or poly-isocyanate with an acrylated epoxidized drying-oil compound.

Acrylated epoxidized drying-oil urethanes are derived from acrylated epoxidized drying oil compounds. A description of the acrylated epoxidized drying-oil compounds and methods for the production of same are disclosed in U.S. Pat. No. 3,125,592 issued Mar. 17, 1964 to Nevin, and U.S. Pat. No. 3,450,631 issued June 17, 1969 to Steinberg. The above patents disclose the use of soybean oil in the making of the acrylated drying-oil compounds and the urethane derivatives thereof. Although not disclosed in the above patents, linseed oil may also be used to make acrylated drying-oil compounds and urethane derivatives thereof by directly substituting linseed oil for soybean oil in the processes for making same. Thus, the term "drying-oil" as used herein means soybean oil and linseed oil.

The acrylated epoxidized drying oil compound is formed by reacting epoxidized drying-oil with an acrylic compound.

A class of these compounds is described in U.S. Pat. No. 4,025,477, issued to Borden et al. on May 24, 1977. Therein is described compounds which are the reaction product of an epoxidized drying oil and acrylic or methacrylic acid. This reaction, described in U.S. Pat. No. 4,025,477, proceeds with the opening of the epoxide ring in the molecule and the addition of the acid. This can be represented by the equation:

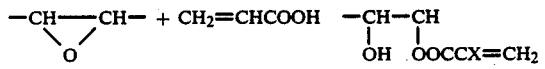

where X is hydrogen or methyl. The acrylated epoxidized drying-oil compound contains an average of at least two such acrylyl or methacrylyl groups per molecule and, in addition, it may also contain some unreacted oxirane, preferably less than 2 weight percent unreacted oxirane.

Another class of acrylated epoxidized drying oils useful for making the epoxidized drying oil urethanes of the invention are the reaction product of an epoxidized drying oil and pentaerythritrol acrylate.

The acrylated epoxidized drying oil compound is reacted with an isocyanate to form the acrylated epoxidized drying-oil urethane derivative useful in the invention. Among the isocyanates that can be used in producing these derivatives are those represented by the general formula, R(NCO), wherein R can be an alkyl group of from 1 to about 15 carbon atoms, or a substituted or unsubstituted aryl group having from 6 to about 12 carbon atoms, and n can be an integer greater than 1, preferably 1 to 4, most preferably 1 or 2. Illustrative thereof, one can mention methyl isocyanate, ethyl isocyanate, butyl isocyanate, 2-ethylhexyl isocyanate, chloroethyl isocyanate, cyclohexyl isocyanate, phenylisocyanate, p.chlorophenyl isocyanate, benzyl isocyanate, naphthyl isocyanate, o-ethylphenyl isocyanate, 2,4-tolylene diisocyanate, 2,6-tolylene diisocyanate, cyanate, 4,4'-diphenylmethane diisocyanate, polymethylene polyphenylisocyanate, dianisidine diisocyanate, 1,6-hexane diisocyanate, m-xylylene diisocyanatne, dicyclohexyl-4,4'-methane diisocyanate, cyclohexane-1,4-diisocyanate, 1,5-naphthalene diisocyanate, 1-isocyanato-3-isocyanatomethyl-3,3,5-tri-methylcyclohexane, diphenylene-4,4-diisocyanate, bicyclo[2.2.1]hept-2-en-5-isocyanate. and the like. Any of the known organic isocyanates can be used, including the tri-and tetra-isocyanate compounds. All of these are well known to those skilled in the art.

The reaction of the acrylated epoxidized drying oil compound with the isocyanato group is via a hydroxyl group to form a urethane link. If the acrylated epoxidized drying oil was derived from acrylic or methacrylic acid, as described in U.S. Pat. No. 4,025,473, the urethane derivatives of the acrylated epoxidized drying oil compound contain the group:

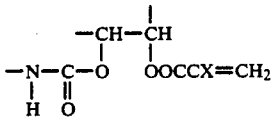

where X is hydrogen or methyl. The number of such groups present can be controlled by the amount of isocyanate compound added to the reaction. All of the hydroxyl groups in the acrylated epoxidized drying-oil compound can be reacted with an isocyanato group, or less than all can be so reacted. Thus, from about 2 to about 100 percent of the available hydroxyl groups can be converted to urethane groups; preferably from about 50 to about 90 percent thereof are reacted with the isocyanato group and converted to the urethane group.

The reaction between the acrylated epoxidized drying oil compounds and the isocyanate to form the acrylated epoxidized drying-oil urethanes useful in the invention can typically be carried out by the slow addition of the isocyanate to the acrylated epoxidized drying-oil compound. The order of addition, however, is not critical. The temperature can be from about 10° C. to about 100° C., preferably from about 20° C. to about 80° C., and most preferably from about 40° C. to about 60° C. After the addition has been completed, the reaction mixture is stirred to ensure completion of reaction. The time required will vary, of course, depending upon the size of the batch, the reactants used, the temperature of the reaction and other variables known to affect chemical reactions in general. A solvent can be present if desired. It is preferably an inert solvent that will not interfere with the reaction. These are well known and include ethers, hydrocarbons, ketones and esters. Examples are diethyl ether, p-dioxane, dibutyl ether, tetrahydrofuran, diisopropyl ether, methyl ethyl ketone, methyl n-propyl ketone, methyl propionate, ethyl acetate, hexane. toluene, xylene, benzene, and the like. Of course, the presence of water is known to be detrimental when an isocyanate group is involved since this group reacts readily and rapidly with water. Any one of the conventional catalysts known to promote the reaction of an isocyanato group with a reactive hydrogen atom of the hydroxyl group can be used. The number of such catalysts is large, and illustrative thereof one can mention triethylamine, N,N,N',N'-tetramethylbutane-1,3-diamine, dibutyltin dilaurate, stannous octoate, stannous laurate, dioctyltin diacetate, lead octoate, bis[2-(N,N-dimethylamino)ethyl]ether, 1,4-diazabicyclo[2.2.-2]octane and the like.

ACRYLATE-CAPPED POLYCAPROLACTONES

The acrylate-capped polycaprolactones useful in the invention are described in U.S. Pat. No. 3,700,643, issued Oct. 24, 1972 to Smith et al. They are reaction products of a caprolactone polyol, a substituted or unsubstituted isocyanate, and an acrylyl compound, and can be defined by the formula;

$$(CH_2{=}\underset{\underset{Z}{|}}{C}COOROOCNH{-}G{-}NHCOO)_x{-}Q$$

where Z is hydrogen or methyl; Q is the residue remaining after reaction of the caprolactone polyol with the isocyanate and acrylyl compound, hereinafter more fully described; R is a linear or branched divalent alkylene having from 2 to about 5 carbon atoms; G is the polyvalent residue remaining after reaction of the polyisocyanate with the caprolactone polyol and acrylyl compound and can be a linear or branched alkylene having from 1 to about 10 carbon atoms, or arylene, alkarylene and aralkylene having from 6 to about 12 carbon atoms, cycloalkylene having from 5 to about 10 carbon atoms, or bicycloalkylene having from 7 to about 15 carbon atoms; and x is an integer having a value from 1 to 4, preferably 2. Preferably R is linear having 2 or 3 carbon atoms.

The polycaprolactone polyol residue represented by Q is produced from caprolactone or a caprolactone polyol. The caprolactone polyols, whether monohydric or polyhydric, are commercially known compositions of matter and are fully described in U.S. Pat. No. 3,169,945 issued Feb. 16, 1965 to Hostettler and Young. As used in this specification, the terms caprolactone polyols and polycaprolactone polyols include compounds having one or more hydroxyl groups. As described therein, the caprolactone polyols are produced by the catalytic polymerization of an excess of the caprolactone compound with an organic functional initiator having at least one reactive hydrogen atom: the polyols can be single compounds or mixtures of compounds, either can be used in this invention. The method for producing the caprolactone polyols is of no consequence. The organic functional initiators can be any hydroxyl compound, as shown in U.S. Pat. No. 3,169,945, and include methanol, ethanol, propanol, decanol, benzyl alcohol, and the like: diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols and similar polyalkylene glycols, either block, capped or heteric, containing up to about 40 or more alkyleneoxy units in the molecule, 3-methyl-1,5-pentanediol, cyclohexanediol, 4,4'-methylene-biscyclohexanol, 4,4'-isopropylidenebiscyclohexanol, xylenediol, 2-(4-hydroxymethylphenyl)-ethanol, and the like; triols such as glycerol, trimethylolpropane, 1,4 -butanediol, 1,2,6-hexanetriol, triethanolamine, triisopropanolamine, and the like; tetrols such as erythritrol, pentaerythritol. N,N,N',N'-tetrabis(2- hydroxyethyl) ethylenediamine, and the like.

When the organic functional initiator is reacted with the caprolactone a reaction occurs that can be represented in its simplest form by the equation:

$$R''(OH)_x + O{=}\underset{\underset{O}{|}}{C}(CR'_2)_4CHR' \longrightarrow R''([\overset{\overset{O}{\|}}{O}C(CR'_2)_4CHR']_m)OH)_x$$

In this equation the organic functional initiator is the $R''(OH)_x$ compound and the caprolactone is the $$O{=}\underset{\underset{O}{|}}{C}(CR'_2)_4CHR'$$

compound; this can be preferably caprolactone itself or a substituted caprolactone wherein R' is an alkyl, alkoxy, aryl, cycloalkyl, alkaryl or aralkyl group having up to twelve carbon atoms and wherein at least six, preferably all, of the R' groups are hydrogen atoms. The polycaprolactone polyols that are used to produce the acrylate-capped polycaprolactone polyols of this invention are shown by the formula on the right hand side of the equation; they can have a molecular weight of from 130 to about 20,000. The preferred caprolactone polyol compounds are those having a molecular weight of from about 175 to about 2,000. The most referred are the polycaprolactone diol compounds having a molecular weight of from about 350 to about 1,000; these are most preferred because of their low viscosity properties. In the formula, m is an integer representing the average number of repeating units needed to produce the compound having said molecular weights.

G is the residue of a polyisocyanate. Suitable polyisocyanates for use in forming the caprolactone urethanes include 2,4-tolylene diisocyanate, 2,6-tolylene diisocyanate, 4.4'-diphenylmethane diisocyanate, dianisidine diisocyanate, tolidine diisocyanate, hexamethylene diisocyanate, the m- and p-xylene diisocyanates, tetramethylene diisocyanate, dicyclohexyl-4,4'-methane diisocyanate, cyclohexane-1,4-diisocyanate, isophorone diisocyanate, 1,5-naphthylene diisocyanate, 4,4'-diisocyanate di- phenyl ether, 2,4,6-triisocyanate toluene. 4,4',4''-triisocyanate triphenyl methane, di- phenylene-4,4-diisocyanate, the polymethylene polyphenylisocyanates, as well as any of the other organic polyisocyanates known in the art.

Illustrative of R, one can mention the divalent radicals ethylene, 1,3-propylene, 1,2-propylene, butylene, pentylene, and the like. Suitable alkyl groups, dependent on the chain length definition set forth, are methyl, ethyl, propyl, isopropyl, butyl, isobutyl, pentyl, neopentyl, hexyl, octyl, 2-ethyloctyl, decyl, dodecyl, and the like. These are all obvious and known to those skilled in the art.

The acrylyl compounds suitable for use in producing the acrylate-capped polycaprolactones are the hydroxyalkyl acrylates and the hydroxyalkyl methacrylates of the formula $$CH_2{=}\underset{\underset{Z}{|}}{C}COOROH$$

wherein Z and R are as previously defined. The hydroxyalkyl acrylyl compounds are well known and can be illustrated by hydroxyethyl acrylate, hydroxyethyl methacrylate, hydroxypropyl acrylate, hydroxypentyl methacrylate, and the like.

The acrylate-capped polycaprolactone polyol derivatives can be produced by several procedures and can be single compounds or mixtures of compounds.

The acrylate-capped polycaprolactone urethanes useful in the invention can be produced by heating a mixture of polycaprolactone polyol, hydroxyalkyl acrylate and organic isocyanate, preferably in contact with one of the known catalysts for urethane reactions. They include triethylene diamine, morpholine, N-ethylamine. piperazine, triethanolamine, triethylamine, N,N,N',N'-tetramethylbutane-1,3-diamine dibutyltin, dilaurate, stannous octoate, stannous laurate, dioctyltin diacetate, lead octoate, stannous oleate, stannous tallate, dibutyltin oxide, etc. The reaction can also be carried out by adding the organic isocyanate to a mixture of the other components, or by feeding the polycaprolactone polyol and hydroxyalkyl acrylate, either as a mixture or in separate streams to the organic isocyanate. In any event, the reaction can be carried out either in the presence or absence of a solvent. The solvent is preferably one which does not contain active hydrogen groups, i.e., hydroxyl, amino, amido, etc., in the solvent molecule. Among the suitable solvents one can mention the hydrocarbons such as octane, benzene, toluene, the xylenes, etc.; the ketones such as acetone, methyl ethyl ketone, etc.; the ethers such as diisopropyl ether, di-n-butyl ether, etc.; and the reactive solvents or reaction diluent monomers, described below, normally used in producing coating compositions that subsequently become incorporated in the ink.

The mole ratio of the polycaprolactone polyol to hydroxyalkyl acrylate can range from 1:0 to 1:25 preferably from 1:2 to 1:5 with sufficient organic isocyanate being added to react with all or substantially all of the hydroxyl groups present.

The reaction temperatures can vary from about 20° C. to about 90° C. or higher, but are preferably from about 50° C. to about 75° C. The reaction time will vary according to the size of the batch, the nature of the organic isocyanate, polycaprolactone polyol and acrylyl compound, as well as the reaction temperature employed.

The reaction can be carried out in air or in an inert gas atmosphere. Precautions should be taken to exclude water, which is known to react with the isocyanate group. To prevent premature reaction of the unsaturated acrylyl group, about 5 to 1,000 ppm of a compound known to inhibit free radical polymerization can be added. These inhibitors are well known and include phenothiazine, hydroquinone, the monomethyl ether of hydroquinone, 2,6-di-t-butyl-p-cresol and other hindered phenols.

Illustrative of polycaprolactone polyols that can be used as starting materials in the acrylate-capped polycaprolactones useful in the invention one can mention the reaction products of a polyhydroxyl compound having from 1 to 4 hydroxyl groups with caprolactone. The manner in which these caprolactone polyol compositions are produced is shown in U.S. Pat. No. 3,169,945 and many such compositions are commercially available.

ULTRAVIOLET PHOTOINITIATOR

The photoinitiator is presented to absorb the ultraviolet radiation and initiate the polymerization and cross-linking reactions that constitute the curing of the ink composition. These photoinitiators are well known in the art of ultraviolet light curable coatings and any photoinitiator is suitable that provides for a sufficiently rapid cure rate.

Suitable photoinitiators include tetramethyldiaminobenzophenone (Michler's Ketone) in solution with benzophenone. Typically a solution comprising about 20 weight percent Michler's Ketone and 80 weight percent benzophenone is used. Other suitable photoinitiators include isobutyl bensin ether, diethoxy acetophenone, benzoin isopropyl ether, benzoin methyl ether and 2,2-dimethoxy-2-phenylacetophenone. The preferred photoinitiator is 2,2-dimethoxy-2-phenylacetophenone.

Preferably, the photoinitiator should be chosen such that the ink composition is stable at storage conditions (about 20°-30° C.). In this context, "stable" means that there is no gelling or undesirable increase in viscosity over the time the ink composition is stored or there is no significant discoloration of the ink composition, such that the utility of the composition of the ink is affected. Photoinitiators used wherein the ink compositions did not gel within 26 days are 2,2-dimethoxy-2-phenylacetophenone, and diethoxy acetophenone. Isobutyl benzoin ether and benzoin methyl ether caused gellation of the ink composition in 1 or 2 days.

The photoinitiator is preferably present in an amount of about 1 to about 10 weight percent, most preferably about 3 weight percent to about 7 weight percent, based on the total weight of the composition.

PIGMENT

Suitable pigments include colored organic and inorganic compounds of dyes that are normally used to impart color. The pigment should be substantially non-reactive with the components of the ink. Preferably the pigment should have a low absorption in the near ultraviolet light spectrum. Suitable pigments are identified in Table A below.

TABLE A

| Pigment | Pigment No. | Index No. |
|---|---|---|
| Titanium Dioxide (Rutile) | White 6 | 77891 |
| G.S. Benzidine Yellow (AAOA) | Yellow 17 | 21105 |
| R.S. Benzidine Yellow (HR) | Yellow 83 | — |
| Benzidine Orange (G) | Orange 13 | 21100 |
| Naphthol Red | Red 170 | — |
| Red Lake C | Red 53 | 15585 |
| Carmine Red | Red 176 | — |
| Watchung Red 2B | Red 48 | 15865 |
| Quinacridone Red | Red 122 | 46500 |
| Lithol Rubine | Red 57 | 15850 |
| Phthalocyanine Blue | Blue 15 | 74160 |
| Carbazole | Violet 23 | 51318 |
| Phthalocyanine Green | Green 7 | 74260 |
| Carbon Black | Black 7 | 77266 |
| Aluminum Flake | Metal 1 | 77000 |

The pigment should be used in an amount such that an impression is formed with good covering properties and a proper color density. The pigment should not be used in such an amount that the ink will chalk on drying or change the viscosity of the ink to an unacceptably high level. above about 65,000 centipoise at 25° C. Preferably the pigment is used in an amount greater than 0 up to about 70 weight percent, most preferably about 10 to about 50 weight percent, based on the total weight of the ink composition.

REACTIVE DILUENT MONOMER

The reactive diluent monomer in the composition of the invention is optionally added to obtain a practical viscosity of the composition. Typically the viscosity should be from about 50 to about 65,000 centipoise, preferably about 2,000 to about 20,000 centipoise, at 25° C. The reactive diluent monomer should be reactive, under the conditions in which the ink is cured, with the first urethane and the second urethane components of the composition of the invention to form a crosslinked resinous structure when the ink is cured. Since the preferred use of the ink of the invention is for printing upon a food packaging, the reactive diluent monomer should preferably not impart an odor or a toxicity to the cured ink. Suitable reactive diluent monomers are well known in the art. The preferred reactive diluent monomers are glycidyl methacrylate and H-vinyl-1-pyrrolidone. The reactive diluent monomer is preferably present in an amount of about 2 to about 30 weight percent, most preferably about 5 weight percent to about 20 weight percent, based on the total weight of the ink.

The ink composition of the invention is made by mixing the components by methods well known in the art. For example by use of a change-can mixer, dough mixer, sigma arm mixer, or the like. The ink is typically ground after mixing, using, for example, a roll mill commonly used in ink manufacture.

The ink composition is applied to a substrate by any suitable method known in the art such as offset printing, letter press, reverse roll, wire wound rod, air knife, flexography, gravure, or the like.

Although any substrate is suitable, the ink composition, as discussed above, is designed for use on polymeric film substrates such as those used as sausage casings. These include substrates of regenerated cellulose, fibrous-reinforced regenerated cellulose, treated polyethylene, polyethylene terephthalate, vinyl chloride-vinylidene chloride copolymer. polyvinylidene chloride, polyvinyl, polyvinyl butyral, polymethylmethacrylate, polystyrene acrylonitrile, cellulose acetate, glassine, ethylene vinyl acetate copolymer and the like. The preferred substrate materials are films of fresh and aged regenerated cellulose, fibrous-reinforced regenerated cellulose and these same films with any of the various coatings common in the art. An example of such a coated film is the so-called "MP fibrous casing", which has a barrier layer of polyvinylidene chloride resin.

The excellent adhesion properties of the cured ink impression of the invention to the substrate, is best realized on film substrates coated with polyvinylidene chloride. For use on cellulosic substrates that are not so coated, a coating of an uncured "primer" coating is preferred to increase the adhesion of the ultra-violet radiation cured ink. Suitable primers include resins based on polyester, vinyl, cellulose acetate butyrate or acrylic ester, in a suitable solvent with polyfunctional aromatic or aliphatic isocyanates. Examples of suitable resins include "Acryloid B-48" TM from Rohm & Haas Company, Philadelphia, Penna., which is a solution of acrylate or methacrylate ester polymers, and "Saran F-120" TM from Dow Chemical Co., Midland, Michigan, which is a copolymer of vinylidene chloride and acrylonitrile. Suitable polyisocyanates include those polyisocyanates commonly used in the art in the coating technology, such as "Mondur CB-75" TM, which is a polyisocyanate available from Mobay Chemical Corporation, Pittsburgh, Pennsylvania. The primer coating can be applied as a solution of the primer coat material with an appropriate solvent in an amount to wet the substrate surface. Suitable solvents include toluene, xylene, methylethylketone, nitropropane, CELLOSOLVE TM acetate (B-ethoxy-ethylacetate), and ethylacetate. Preferably, a primer coating should be chosen so as not to inhibit the smoke permeability or other desirable physical properties of the substrate in relation to its use. An example of a suitable prime coat solution is one comprising about 19 weight percent "Acryloid B-48" TM, 77 weight percent ethyl acetate and 4 weight percent "Mondur CB-75 TM".

The ink composition may also contain other additives commonly used in polymerizable ink formulations. These include pigment dispersing agents, leveling agents, fillers, and polymerization inhibitors.

After application upon a substrate, the ink composition of the invention is cured by exposure to ultraviolet light for a sufficient length of time to cure the ink to a tack-free state. It is important that the ink be fully cured to a tack free state to obtain the desired adhesion necessary for sausage casing applications. Methods for curing inks with ultraviolet light are well known in the art. When used upon sausage casings, the ink composition of the invention can be cured rapidly during the normal processing of the casing, using a suitable in-line ultraviolet light curing apparatus. This eliminates the need for off-line ink curing racks and the accompanying extra time and handling required. These measures are generally necessary when using solvent-based conventional inks of the prior art that require a significantly longer cure time.

The following examples illustrate the invention and are not intended to limit it in any way.

In the following examples the compositions identified below were used;

Polyol urethane A (PU-A): The exact nature of this composition is not known, but it is believed to have been made by the process of above-cited U.S. Pat. No. 4,174,307 by reacting a diisocyanate with a polyol to form an intermediate and reacting this intermediate with a monomeric olefinically unsaturated compound to form a polyol urethane. It was available from Polychrome Corporation, Yonkers, New York under the tradename "UVIMER DV-588 TM".

Polyol urethane B (PU-B): The exact nature of this composition is not known, but it is believed to have been made by the process of above-cited U.S. Pat. No. 4,174,307 by reacting a diisocyanate with a polyol to form an intermediate and reacting this intermediate with a monomeric olefinically unsaturated compound to form a polyol urethane. It was available from Polychrome Corporation, Yonkers, New York under the tradenames "UVIMER DV-545 TM".

Acrylated Epoxidized Drying-Oil urethane A (AEDOU-A): This composition was made by reacting soybean oil with pentaerythritrol acrylate to form an intermediate. Pentaerythritrol acrylate is a mixture of mono-, di-, tri-, and tetraacrylates of pentaerythritrol, with an average functionality of 3.1 to 3.3. The intermediate is reacted with an isocyanate to form acrylated epoxidized drying-oil urethane, which was available from Union Carbide Corporation, Danbury, Connecticut under the tradename "Actomer X-80 TM".

Acrylate-capped polycaprolactone urethane A (APU-A): This composition was made essentially as described in the above cited U.S. Pat. No.3,760,643 by charging 569 g of isophorone diisocyanate and 1.68 g of dibutyl tin dilaurate to a flask, equipped with a stirrer, thermometer, dropping funnel and reflux condenser, heated to 45° to 50° C., 530 g of a difuntional polycaprolactone polyol with a molecular weight between about 500 and 600 were added dropwise. 576 g of hydroxyethyl acrylate were then added and the reaction continued until it was completed. The polycaprolactone polyol was available from Union Carbide Corporation, Danbury. CT, under the name "PCP-200 TM". Alternately, the inks of the invention may also be made by using an acrylate-capped polycaprolactone made essentially as described, except a caprolactone polyol available from Union Carbide Corporation under the name "PCP-240 TM" is used instead of "PCP-200 TM" and tetramethylene diisocyanate instead of isophonone diisocyanate. "PCP-240 TM" is similar to "PCP-200 TM" but has a molecular weight of about 2000.

Acrylate-capped polycaprolactone urethane B (APU-B): This composition was made essentially as APU-A above.

Acrylate-capped polycaprolactone urethane C (APU-C): The exact nature of this composition is not known. It is believed to be made as described in the above-cited U.S. Pat. No. 3,760,643. It was obtained from DeSoto, Inc., Des Plaines, Illinois under the tradename "DeSolite 2353-144 TM".

Unless otherwise indicated, the inks in the following examples were made using a three roller mill like those commonly used in ink manufacture. The ink components were thoroughly blended and ground in the mill until the components of the ink were finely ground and dispersed.

Unless otherwise indicated, the inks were applied to the subtrate by rolling a suitable quantity thereof on a glass plate and transferring the applied ink from the glass plate to the substrate using a hand-held rubber roller. An amount of ink was chosen such that an ink film of about 3 mils (0.08 mm) thick was produced.

The inks were cured with ultraviolet light using a Linde Photocure System (PSCU), available from Union Carbide, Danbury, Connecticut, and a medium pressure mercury arc unit (MPHG). The PSCU contained 29 one-watt per inch cool mercury resonance lamps with a 46% UV output conversion efficiency. The lamps emitted short wave ultra-violet light at wavelengths of 1849 Angstroms and 2537 Angstroms, as well as visible radiation. The air within the PSCU was inerted by replacing the air with an inert gas (nitrogen) to prevent oxygen from inhibiting surface cure. The MPHG was equipped with lamps emitting a range of ultraviolet radiation with a wave length less than about 4000 Angstroms, as well as visible and infrared radiation. To cure the ink, the substrate with the ink thereon was passed through the PSCU then through the MPHG on a conveyorized belt that could be operated at a variable speed to control the cure time.

In the following examples, adhesion of the cured ink was determined by boiling the printed substrate in water for two minutes, rubbing the ink with a finger, and observing the amount of ink thereby removed.

The cure of the ink is defined herein as the conversion of a free-flowing liquid to a tack-free solid that forms a film that cannot be scratched by a fingernail.

Flexibility of the cured ink in the following examples was determined by boiling a printed substrate for two minutes and stretching the casing to its maximum elongation and observing whether cracking of the ink film occurred.

EXAMPLE 1

Five ink compositions were formulated as indicated in Table B. The numbers in Table B refer to the amount of the indicated components in the ink composition in weight percent of the total ink composition. The pigment used was Napthol Red F5RK, available from American Hoechst, Dyes & Pigment Division, Coventry, R. I. The reactive diluent used was N-vinyl-2-pyrrolidone, available from GAF Corporation, New York, New York under the name "V-Pyrol TM". The photoinitiator used was 2,2-dimethoxy-2-phenylacetophenone, available from Ciba-Geigy Corporation, Ardsley, New York under the name "Irgacure 651 TM".

TABLE B

| Formulation | A | B | C | D | E |
|---|---|---|---|---|---|
| PU-B | 70 | — | 35 | 50 | 20 |
| APU-C | — | 70 | 35 | 20 | 50 |
| Pigment | 15 | 15 | 15 | 15 | 15 |
| Reactive Diluent | 10 | 10 | 10 | 10 | 10 |
| Photoinitiator | 5 | 5 | 5 | 5 | 5 |

The inks were made and applied as described above to a fibrous reinforced cellulosic casing. Before application of the ink, the casing was primed with a primer coat comprising 19.2 weight percent of an acrylic ester, 76.9 weight percent 2-Nitropropane, and 3.9 weight percent of a polyfunctional isocyanate prepared by reacting 1 mole of trimethylol propane with 4.2 moles of propylene oxides. The isocyanate was obtained as "Desmodur N TM" from Mobay Chemical Corporation, Pittsburgh, Pa. The inks were then cured by passing the casing substrate with the uncured ink applied thereon through the above described curing apparatus at a speed of about 200 ft/min (1.02 m/s).

After the cure, each formulation was evaluated for flexibility by the above described method and the surface was observed for the extent of cure. The results are summarized in Table C.

TABLE C

| Formulation | Flexibility | Cure |
|---|---|---|
| A | Brittle | Hard, Glossy, Fully Cured |
| B | Good | Soft, Tacky, Uncured |
| C | Good | Glossy, Fully Cured |
| D | Marginal | Fully Cured |
| E | — | Soft, Tacky, Uncured |

As shown by the data shown in Table C, formulations A and D, which contain no or an inadequate proportion of the second urethane of the invention (an acrylate capped polycaprolactone) have excellent curing properties but have unacceptable or only marginal flexibility properties. Formulation B, having no or an inadequate proportion of the irst urethane of the invention (a polyol urethane), has good flexibility properties but does not cure in the rapid cure conditions of this example to form a fully cured impression. Likewise, formulation E, which has an inadequate amount of the first urethane, does not adequately cure. Formulation C, which illustrates the present invention, shows both good curing and flexibility properties.

EXAMPLE 2

Four additional ink formulations were prepared using the procedure of Example 1. The pigment was 2B-Red. The photo initiator was isobutyl benzoin ether, available from Stauffer Chemical Company, Westport, Connecticut, under the name "Vicure 10 TM ". The components and the amount of each component in weight percent in each formulation are shown in Table D.

TABLE D

| Formulation | A | B |
|---|---|---|
| PU-B | 31.8 | 77.3 |
| APU-C | 45.5 | — |
| Vicure 10 | 9.1 | 9.1 |
| Pigment | 13.6 | 13.6 |

The ink formulations were applied as in Example 1 to a cellulosic casing substrate primed with the primer of Example 1 and cured as in Example 1 except that the speed of the conveyor was set at 400 ft/min (2.03 m/s). The inks were evaluated as described above for adhesion, flexibility and extent of cure. The results are summarized in Table E.

TABLE E

| Formulation | Adhesion | Flexibility | Cure |
|---|---|---|---|
| A | Good | Good | Cured |
| B | Good | Poor | Cured |

As shown by the data shown in Table E, formulation A which was made according to the invention has good adhesion, flexibility, and cure properties, whereas formulation B, which is not within the scope of the invention, has poor flexibility.

EXAMPLE 3

Various pigments and reactive diluent monomers were used in ink formulations made according to the invention and their effect on cure rate was evaluated.

Formulations containing different ultraviolet light photoinitiators were made and evaluated for cure speed. The inks were made, applied to a polyethylene film substrate, and cured as described above. Three different pigments were used; a titanium dioxide pigment (white), HR Yellow-pigment (yellow), and Napthol Red. The first urethane used is shown in Tables G, I and K. The second urethane used was APU-A. The reactive diluent monomer used was the same as that used in Example 1. The ultraviolet photoinitiators (UVP) used were isobutyl benzoin ether (IBE), obtained from Stauffer Chemical Company, Westport, Conn., under the name "Vicure 10 TM ", 2,2-dimethoxy-2-phenyl- acetophenone (DMP), obtained from Ciba-Geigy Corporation, Ardsley, New York, under the name "Irgacure 651 TM ", benzoin methyl ether (BME), diethoxy acetophenone (DEAP), and a 20 wt. % solution of Michler's Ketone in benzophenone (MK). In Tables F, M, and J are shown, in weight percent of the total composition, the amounts of the components used in the formulations for each pigment tested. In Tables G, I, and K are shown the cure speeds for the inks of Tables F, H and J, respectively, using different ultraviolet initiators. "Cure speed" is the maximum speed of the conveyor of the photocure system at which the ink is cured. The cure speeds are shown in the format, XXX(Y.YY), where XXX is the speed in feet per minute and Y.YY is the speed in meters per second. The highest conveyor speed used in the tests of this example was 275 ft/sec (1.40 m/s). The cure speeds of the compositions of Table H would have been higher if a higher conveyor speed could have been used, indicating a more rapid cure rate. The asterisk by a speed denotes that the composition was not cured at that speed.

TABLE F

| White | |
|---|---|
| Component | Wt. % |
| Pigment | 30.0 |
| First Urethane | 30.0 |
| Second Urethane | 35.0 |
| Photo Initiator | 5.0 |

TABLE G

| Cure Speed - White | | | |
|---|---|---|---|
| | First Urethane | | |
| UVP | AEDOU-A | PU-B | PU-A |
| IBE | 115(0.58)* | 200(1.02) | 175(0.89) |
| DMP | 200(1.02) | 275(1.40) | 250(1.27) |
| BME | 115(0.58) | — | 200(1.02) |
| DEAP | 115(0.58) | — | 115(0.58) |
| MK | 115(0.58) | 200(1.02) | 115(0.58) |

TABLE H

| Yellow | |
|---|---|
| Component | Wt. % |
| Pigment | 14.2 |
| First Urethane | 33.3 |
| Second Urethane | 38.0 |
| Reactive Diluent | 9.5 |
| Photo Initiator | 5.0 |

TABLE I

| Cure Speed - Yellow | | |
|---|---|---|
| | First Urethane | |
| UVP | AEDOU-A | PU-B |
| IBE | 275(1.40) | 275(1.40) |
| DMP | 275(1.40) | 275(1.40) |
| BME | 275(1.40) | 275(1.40) |
| DEAP | 275(1.40) | 275(1.40) |
| TR | 275(1.40) | 275(1.40) |

TABLE J

| Red | |
|---|---|
| Component | Wt. % |
| Pigment | 14.2 |
| First Urethane | 33.3 |
| Second Urethane | 38.0 |
| Reactive Diluent | 9.5 |
| Photo Initiator | 5.0 |

TABLE K

| Cure Speed - Red | | |
|---|---|---|
| | First Urethane | |
| UVP | AEDOU-A | PU-B |
| IBE | 115(0.58) | 275(1.40) |

TABLE K-continued

| | Cure Speed - Red | |
|---|---|---|
| | First Urethane | |
| UVP | AEDOU-A | PU-B |
| BME | 275(1.40) | 275(1.40) |
| DMP | 200(1.02) | 275(1.40) |

The results shown above demonstrate the practice of the invention and the rapid curing rates obtainable thereby.

EXAMPLE 4

Ink compositions of the invention and ink compositions containing other acrylated-typed urethanes were made and evaluated. The components in the ink composition of the invention and the amounts thereof, in weight percent of the total composition, are shown in Table L. Other ink compositions were made as the composition of the invention except other acrylated-type urethane was used in place of APU-C. The acrylated-type urethanes used were polyol urethanes available as "Uvithane TM" 782, 783, and 788, from Polychrome Corporation. Yonkers, New York and difunctional, hydroxyl terminated urethane resins available as "Purelast TM" 166, 169, 176, and 186, from Polymer Systems Corp., Little Falls, N.J. The pigment was titanium dioxide "R-915 TM" identified in Example 3, and the reactive diluent and the photoinitiator were the same as in Example 3.

TABLE L

| | Ink Composition |
|---|---|
| Component | Wt. % |
| Pigment | 28.5 |
| APU-C | 33.2 |
| PU-B | 28.5 |
| Reactive Diluent | 4.8 |
| Photoinitiator | 5.0 |

Uvithane 782, 783, 788 resulted in flexible coatings but the cure rate was very slow. The viscosity was also very high causing difficulty in handling. Purelast 166, 169, 176 , 186 produced brittle ink impressions with only moderate to poor cure rates. Uvithane 893 produced a flexible film with a good cure rate, but the viscosity was too high, resulting in difficulty in handling.

The results here show the difficulty in obtaining a suitable ink composition for use on sausage casings and the like. As described above, the inks produced either were too viscous, too brittle or had inadequate cure rates. It is therefore, unexpected that a ultraviolet light curable ink that has the advantageous properties of the invention, rapid cure rate, high flexibility and low viscosity, could be produced.

Tests were also made from a first urethane and plasticizers commonly used in the art, in an attempt to provide for more flexibility. It was found that the plasticizer containing inks were more flexible than the brittle inks containing only a first urethane. However, the cure-rate was adversely affected such that these formulations were unsuitable. By practice of the invention, using the first urethane and the second urethane as defined, herein, it was possible to make low viscosity, rapidly curable inks that formed flexible adhering impressions suitable for flexible films.

EXAMPLE 5

Three ink formulations were made and evaluated. The components and the amounts thereof, in weight percent of the total compositions are in Tables M, N and O. The reactive diluent was glycidyl methacrylate (GMA), obtained from Blemmer Chemical, West Caldwell, New Jersey, under the name "Blemmer G TM". The white pigment was titanium dioxide "R-915 TM" described in Example 3; the yellow pigments were AAOA-Yellow, and H.R. Yellow, and the red pigment was Naphthol Red. The photoinitiator was a mixture of benzophenone and Michler's Ketone. An organic derivative of a special magnesium montmonillonite, available as "Bentone 38 TM" from NL Chemicals, Heighstown, N.J., was used as a rheological agent.

TABLE M

| Component | Wt. % |
|---|---|
| Titanium Dioxide | 29.1 |
| PU-B | 36.9 |
| APU-B | 31.0 |
| Michler's Ketone | 3.0 |

TABLE N

| Component | Wt. % |
|---|---|
| Titanium Dioxide | 21.2 |
| AAOA Yellow | 2.7 |
| H.R. Yellow | 2.1 |
| PU-B | 33.6 |
| APU-B | 24.4 |
| GMA | 4.4 |
| Benzophenone | 7.0 |
| Michler's Ketone | 3.0 |
| Bentone 38 | 1.5 |

TABLE O

| Component | Wt. % |
|---|---|
| Naphthol Red | 10.6 |
| PU-B | 35.4 |
| APU-B | 35.4 |
| GMA | 7.1 |
| Benzonephenone | 7.0 |
| Michler's Ketone | 3.0 |
| Bentone 38 | 1.5 |

The inks were made as described above. The inks were applied to an MP fibrous casing substrate using a letter press. Each of the three inks, above, were applied individually in layers on the substrate to form a multicolored pattern. After delivery from the press, and after application of the third ink layer, the substrates were conveyed on a belt at a speed of 160 feet/minute (0.81 m/s) through the MPHG photocuring unit, described above, with no inerting in the photocuring unit. The colors printed over uncured or partially cured ink were found to have good intercoat adhesion. When the ink was applied over a fully cured ink, the intercoat adhesion was poor.

Samples of the above printed casing were boiled for about 5 to 10 minutes in a solution having a pH of about 9 to 10. The samples were tested for adhesion and scuff resistance. A conventional oleoresinous ink commonly used in letter-press printing on flexible films was also applied to an MP fibrous casing and tested in the same manner. The printed impressions of each sample were rubbed and scuffed by a finger. The ink made according to the present invention was not removed, while the conventional ink was rubbed off.

What is claimed:

1. An ultraviolet light curable ink composition which comprises;

(i) a first urethane comprising a polyol urethane which is the reaction product of about one equivalent of an isocyanate containing intermediate, the isocyanate intermediate being the reaction product of about one equivalent of a monomeric diol and about two equivalents of an organic polyisocyanate, and about one equivalent oF a monomeric olefinically unsaturated compound containing exactly one active hydrogen, and (ii) a second urethane comprising an acrylate-capped polycaprolactone which is the reaction product of a caprolactone polyol, a substituted or unsubstituted isocyanate, and an acrylyl compound, and defined by the formula;

$$(CH_2{=}\underset{\underset{Z}{|}}{C}COOROOCNH{-}G{-}NHCOO)_x{-}Q$$

where Z is hydrogen or methyl; Q is the residue of the caprolactone polyol, R is a linear or branched divalent alkylene having from 2 to about 5 carbon atoms; G is a linear or branched alkylene having from 1 to about 10 carbon atoms, or arylene, alkarylene and aralkylene having from 6 to about 12 carbon atoms, cycloalkylene having from 5 to about 10 carbon atoms, or bicycloalkylene having from 7 to about 15 carbon atoms; and x is an integer having a value from 1 to 4;

(iii) an ultraviolet photoinitiator in an amount sufficient to cure the ink composition when exposed to ultraviolet light, and (iv) a pigment; wherein the first urethane and the second urethane are present in an amount such that the weight ratio of the first urethane to the second urethane is from about 2:5 to about 3:2.

2. The composition of claim 1 wherein the weight ratio of the first urethane to the second urethane is from about 3:5 and about 5:5.

3. The composition of claim 1 comprising additionally a reactive diluent monomer.

4. The composition of claim 3 wherein the reactive diluent monomer is glycidyl methacrylate or N-vinyl-2-pyrrolidone.

5. The composition of claim 1 wherein the monomeric olefinically unsaturated compound in (i) is an acrylate or methacrylate.

6. The composition of claim 1 wherein the monomeric olefinically unsaturated compound is acrylic acid, cinnamic acid, methacrylic acid, a hydroxyalkyl acrylate, a hydroxyalkyl methacrylate, cinnamyl alcohol, allyl alcohol, diacetone acrylamide or an unsaturated compound containing secondary amino or amido groups.

7. the composition of claim 1 wherein the polyisocyanate in (i) is a diisocyanate.

8. The composition of claim 1 wherein the polyol in (i) is a triol.

9. the composition of claim 1 wherein Z is methyl.

10. The composition of claim 1 wherein Z is hydrogen.

11. The composition of claim 1 wherein x is 2.

12. The composition of claim 1 wherein G is the polyvalent residue remaining after reaction of isophorone diisocyanate with the caprolactone polyol and acrylyl compound.

13. The composition of claim 1 wherein G is the polyvalent residue remaining after reaction of tetramethylene diisocyanate with the caprolactone polyol and acrylyl compound.

14. The composition of claim 1 wherein R is a linear alkylene having 2 or 3 carbon atoms.

15. The composition of claim 1 wherein the caprolactone polyol is the reaction product of a caprolactone having the structure;

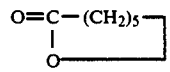

and a dihydroxyl compound.

16. The composition of claim 15 wherein the dihydroxyl compound is ethylene glycol or diethylene glycol.

17. The composition of claim 15 wherein the caprolactone is epsilon-caprolactone.

18. The composition of claim 1 wherein the combined amounts of the first urethane and the second urethane are from about 20 to about 80 weight percent, the photoinitiator is present in an amount from about 1 to about 10 weight percent, and the pigment is present in an amount greater than 0 to about 70 weight percent, based on the total weight of the composition.

19. The composition of claim 1 wherein the combined amounts of the first urethane and the second urethane are from about 50 to about 70 weight percent, the photoinitiator is present in an amount rom about 3 to about 7 weight percent, and the pigment is present in an amount from about 10 to about 50 weight percent, based on the total weight of the composition.

20. The composition of claim 18 wherein a reactive diluent is present in an amount from about 2 to about 30 weight percent, based on the total weight of the composition.

21. The composition of claim 19 wherein a reactive diluent is present in an amount from about 5 to about 20 weight percent, based on the total weight of the composition.

22. A process for the application of ink impressions upon a substrate comprising; providing an ultraviolet curable ink as defined in claim 1, applying the ultraviolet curable ink composition upon a substrate to form a printed impression upon the substrate, and exposing the printed impression upon the substrate to cure said impression to tack-free state.

23. A cured ink film upon a substrate which comprises the reaction product of an ultraviolet light curable ink which comprises;

(i) a first urethane comprising a polyol urethane which is the reaction product of about one equivalent of an isocyanate containing intermediate, the isocyanate intermediate being the reaction product of about one equivalent of a monomeric diol and about two equivalents of an organic polyisocyanate, and about one equivalent of a monomeric olefinically unsaturated compound containing exactly one active hydrogen, and (ii) a second urethane comprising an acrylate-capped polycaprolactone which is the reaction product of a caprolactone polyol, a substituted or unsubstituted isocyanate, and a acrylyl compound, and defined by the formula;

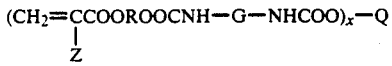

where Z is hydrogen or methyl; Q is the residue of the caprolactone polyol, R is the linear or branched divalent alkylene having from 2 to about 5 carbon atoms; G is a linear or branched alkylene having from 1 to 10 carbon atoms, or arylene, alkarylene and aralkylene having from 6 to about 12 carbon atoms, cycloalkylene having from 5 to about 10 carbon atoms, or bicycloalkylene having from 7 to about 15 carbon atoms; and x is an integer having a value from 1 to 4;

(iii) an ultraviolet photoinitiator in the amount sufficient to cure the ink composition when exposed to ultraviolet light, and (v) a pigment;

wherein the first urethane and the second urethane are present in an amount such that the weight ratio of the first urethane to the second urethane is from about 2:5 to about 3:2.

24. The film of claim 23 wherein the weight ratio of the first urethane to the second urethane is from about 3:5 about about 5:5.

25. The film of claim 23 comprising additionally a reactive diluent monomer.

26. The film of claim 25 wherein the reactive diluent monomer is glycidyl methacrylate or N-vinyl-2-pyrrolidone.

27. The film of claim 23 wherein the monomeric olefinically unsaturated compound in (i) is an acrylate or methacrylate.

28. The film of claim 23 wherein the monomeric olefinically unsaturated compound is acrylic acid, cinnamic acid, methacrylic acid, a hydroxyalkyl acrylate, a hydroxyalkyl methacrylate, cinnamyl alcohol, allyl alcohol, diacetone acrylamide or an unsaturated compound containing secondary amino or amido groups.

29. The film of claim 23 wherein the polyisocyanate in (i) is a diisocyanate.

30. The film of claim 23 wherein the polyol in (i) is a triol.

31. The film of claim 23 wherein Z is methyl.

32. The film of claim 23 wherein Z is hydrogen.

33. The film of claim 23 wherein x is 2.

34. The film of claim 23 wherein G is the polyvalent residue remaining after reaction of isophorone diisocyanate with the caprolactone polyol and acrylyl compound.

35. The film of claim 23 wherein G is the polyvalent residue remaining after reaction of tetramethylene diisocyanate with the caprolactone polyol and acrylyl compound.

36. The film of claim 23 wherein R is a linear alkylene having 2 or 3 carbon atoms.

37. The film of claim 23 wherein the caprolactone polyol is the reaction product of a caprolactone having the structure

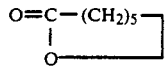

and a dihydroxyl compound.

38. The film of claim 37 wherein the dihydroxyl compound is ethylene glycol or diethylene glycol.

39. The film of claim 37 wherein the caprolactone is epsilon-caprolactone.

40. The film of claim 23 wherein the substrate comprises regenerated cellulose, polyethylene, ethylene vinyl acetate, polyvinylidene chloride, or polyvinyl chloride.

41. The film of claim 40 wherein the film comprises regenerated cellulose.

42. The film of claim 40 wherein the substrate is a sausage casing.

43. An ultraviolet light curable ink which comprises:

(i) a first urethane which comprises the reaction product of an acrylated expoxidized drying oil and and organic isocyanate, and (ii) a second urethane comprising an acrylate-capped polycaprolactone which is the reaction product of a caprolactone polyol, a substituted or unsubstituted isocyanate, and a acrylyl compound, and defined by the formula:

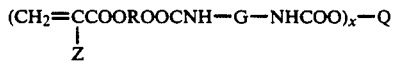

where Z is hydrogen or methyl; Q is the residue of the caprolactone polyol, R is a linear or branched divalent alkylene having from 2 to about 5 carbon atoms; G is a linear or branched alkylene having from 1 to about 10 carbon atoms, or arylene, alkarylene and aralkylene having from 6 to about 12 carbon atoms, cycloalkylene having from 5 to about 10 carbon atoms, or bicycloalkylene having 7 to about 15 carbon atoms; and x is an integer having a value from 1 to 4;

(iii) an ultraviolet photoinitiator in an amount sufficient to cure the ink composition when exposed to ultraviolet light, and (iv) a pigment;

wherein the first urethane and the second urethane are present in an amount such as that the weight ratio of the first urethane to the second urethane is from about 2:5 to about 3:2.

44. The composition of claim 43 wherein the first urethane comprises an acrylated epoxidized drying-oil urethane having in the molecule the group:

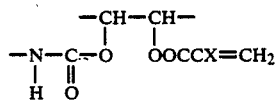

wherein X is hydrogen or methyl, the acrylated epoxidized drying-oil urethane being the reaction product of epoxidized drying-oil reacted with acrylic or methacrylic and an organic isocyanate.

45. The composition of claim 43 wherein the acrylated epoxidized drying oil is the reaction product of epoxidized soybean oil and pentaerythritrol acrylate.

46. The composition of claim 45 wherein the pentaerthritrol acrylate has an average functionality of between about 3.1 and about 3.3.

* * * * *